March 1, 1932. A. L. FREEDLANDER 1,847,177
PULLEY
Filed April 11, 1928 2 Sheets-Sheet 1
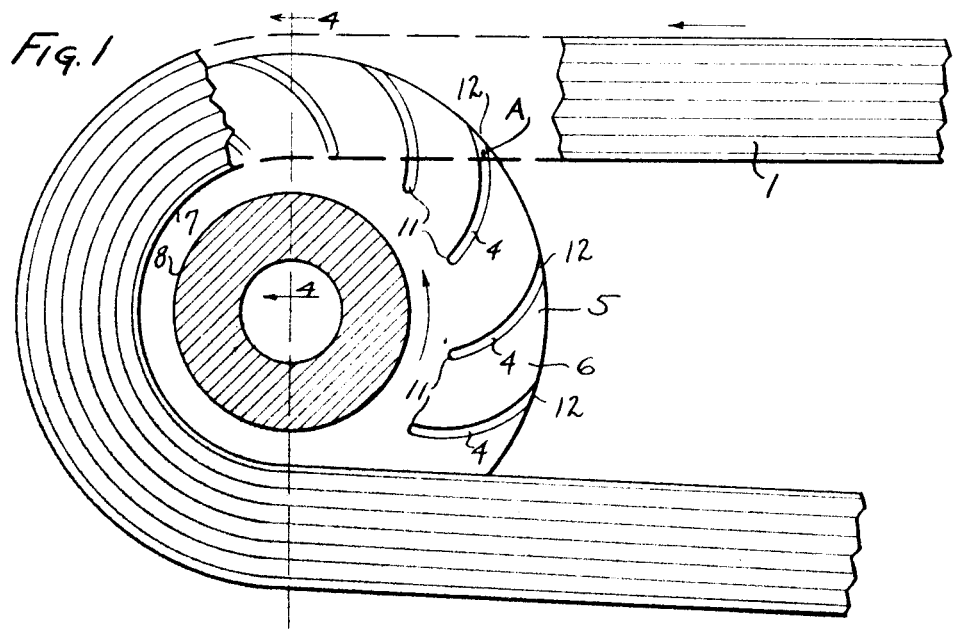
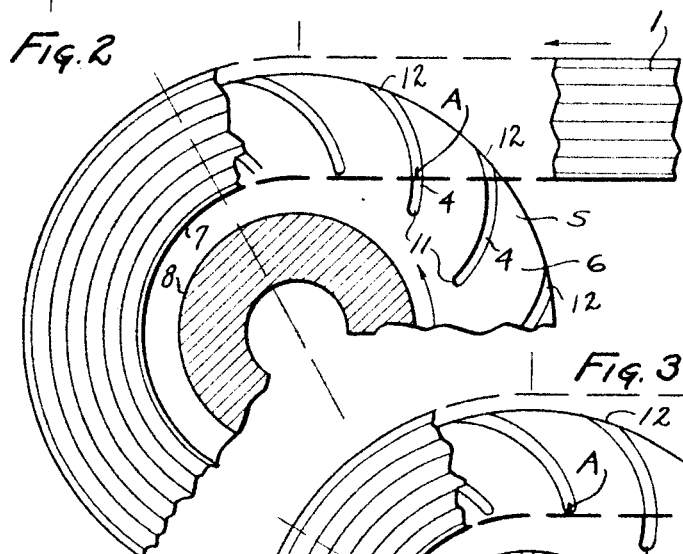
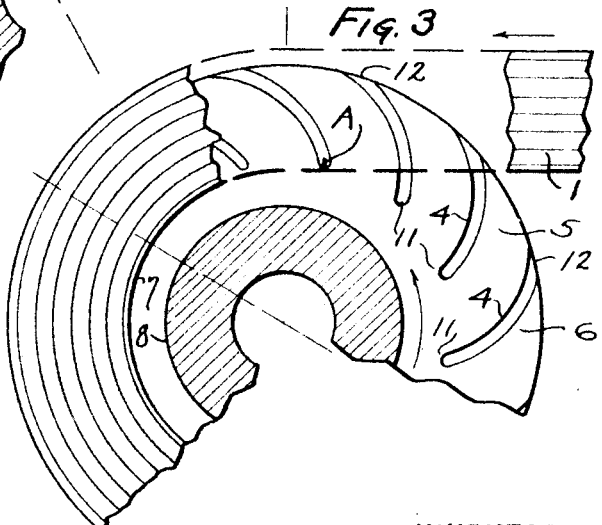
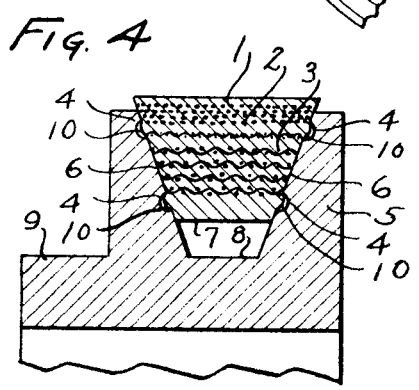
INVENTOR
Abraham L. Freedlander
BY Toulmin & Toulmin
ATTORNEY March 1, 1932.   A. L. FREEDLANDER   1,847,177
PULLEY
Filed April 11, 1928   2 Sheets-Sheet 2
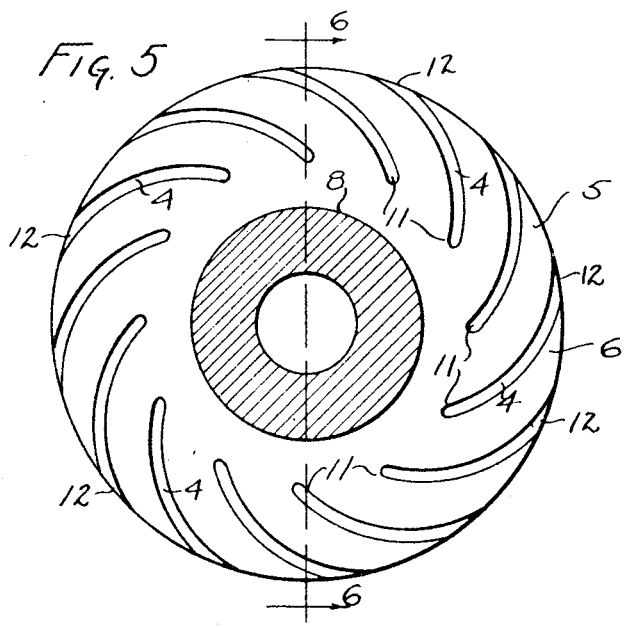
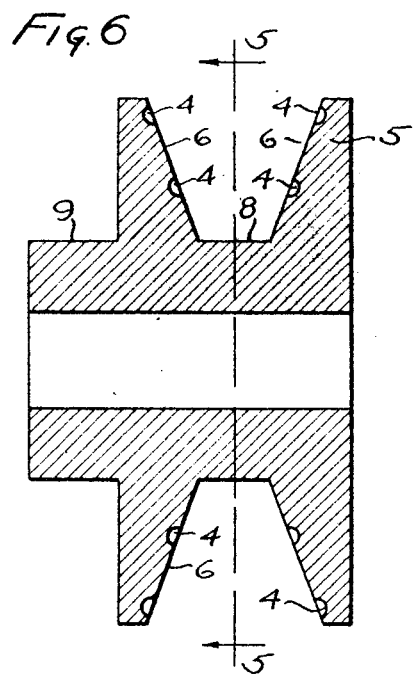
INVENTOR
Abraham L. Freedlander
BY
Toulmin & Toulmin
ATTORNEY Patented Mar. 1, 1932

1,847,177

UNITED STATES PATENT OFFICE

ABRAHAM L. FREEDLANDER, OF DAYTON, OHIO

PULLEY

Application filed April 11, 1928. Serial No. 269,181.

My invention relates to pulleys and, in particular, to pulleys utilized with belts having side drive surfaces.

My invention is especially adapted to pulleys with grooves of trapezoidal section utilized with belts having side drive surfaces, such as those formed by the raw edges of a fabric or combined fabric and rubber belt.

It is the particular object to provide the combination of a belt with side drive surfaces and driven side walls of a pulley, such side walls having grooves for engaging with the side walls of a belt into which grooves the belt may project or not but which will frictionally engage with the side walls of the belt without materially moving relatively thereto and thereby abrading or cutting the side walls of the belt.

It is my object not only to secure the advantages from a side wall drive, but to also secure the advantages from a straight wall compressible belt structure with a V-shaped pulley and advantages usually inherent in gear constructions to thereby materially increase the effectiveness of belts, and in particular belts of the side drive type composed of rubber and fabric with the fabric or cords having their sides or ends exposed in the side walls of the belt in what is known as a raw-edged belt.

Referring to the drawings:

Figure 1 is a diagrammatic view showing in elevation the inside wall of one of the faces of the V-shaped groove of the pulley with the hub of the pulley in section and a side elevation diagrammatically of the belt partially broken away. This view is illustrative of one point of the belt just engaging in one of the grooves and beginning to travel with the pulley;

Figure 2 is a similar view showing the engaging point having moved a step forward with the pulley and also having stepped downwardly in the groove;

Figure 3 shows a similar view with the engaging points as selected on the belt having moved to the bottom of the groove in the pulley where it remains until it reaches an opposite point with the pulley when the selected engaging point moves in its arcuate path outwardly through the arcuate groove of the pulley until dis-engagement of that point with the pulley is effected;

Figure 4 is a section on the line 4—4 of Figure 1;

Figure 5 is a section on the line 5—5 of Figure 6; and

Figure 6 is a section on the line 6—6 of Figure 5.

Referring to the drawings in detail, 1 designates generally a V-shaped belt preferably formed of alternate layers 2 of rubber and fabric or cords 3 which are usually rubberized. Belts of this character are illustrated in the Short Patent No. 1,538,303 or in the Freedlander Patent No. 1,611,830. It is not essential to my invention that belts be of any particular material. It is preferred that they be sufficiently compressible, whether fabric, leather or rubber, so that when placed under tension they will have their side walls forced out into the arcuate grooves 4 of the pulley side walls 5. This is not essential to the operation of the mechanism, but is a preferable condition.

The pulley 5 has the tapered side walls 6 forming a groove that is trapezoidal in section. In the side wall driving belts it is desirable to have the side walls of the pulley engage the side walls of the belt with a wedging action but the bottom 7 of the belt should not engage the horizontal surface 8 which forms the bottom of the pulley groove. The pulley is formed with the usual hub 9 for attachment to a shaft.

It will be noted that when the tension is placed upon the belt, portions of its will be squeezed, as at 10, into the groove 4 so that there will be arcuate projecting ridges on the side of the belt projecting into corresponding arcuate grooves 4 of the pulley. Such grooves are extended inwardly to the point marked 11 which is the approximate lowermost portion of engagement of a belt with the side walls of the pulley while the outer ends of the grooves are open as at 12.

Referring to Figure 1 it will be assumed that the belt is travelling in the direction indicated by the arrow and that the pulley is driving the belt and is travelling in the direction indicated by the arrow. Selecting a given point, such as the point A on the side wall of the belt in Figure 1, it will be seen that that point A has just entered into the pulley and is located at the upper open end of the groove 4. According to my invention, that point A travels in an arcuate path in the arcuate groove having entered through the open mouth of the pulley groove 4 designated 12 and moving downwardly through that groove as shown in Figure 2 until that portion of the belt has entered the pulley groove to its full depth at which time the point A will be at the bottom 11 of the groove 4 as in Figure 3. It will continue at that point as the distance between the center of the pulley and that point remains constant until the lower side of the pulley is reached opposite to the point A as in Figure 3 when the belt begins to move away from the pulley center as the belt straightens out and, in such an event, the point A begins to travel outwardly in an arcuate path in the groove 4 until it makes its exit at the open end 12 of the groove.

Thus, there is no shearing action between the side of the belt and the edge of the groove which would cause any fraying of the belt side but the ridge formed on the compressible belt designated 10 having projected into the groove 4 forms an engaging surface with the groove in the same nature as a gear engagement. It furnishes a supplementary driving surface but relationship of the parts is such that the relative movement is so slight that there is no positive shearing action. Nevertheless the frictional engagement provides the additional driving power and driving surface that is highly desirable in these belts.

As a consequence, it is possible by my invention to provide a much greater driving surface on a pulley of a given dimension, a larger heat radiating surface and all the advantages of gear driving at the same time with the economy of construction and lack of necessity for lubrication incident to the ordinary V-shaped pulley with a side drive belt.

By V-shaped I refer to a belt that has downwardly and inwardly tapering side walls forming an area trapezoidal in section. My invention is adaptable to straight wall pulleys and belts.

It will be understood that I desire to comprehend within my invention such modifications as may be necessary to adapt it to varying conditions and uses.

Having thus fully described my invention, what I claim as new and desire to secure by Letters Patent, is:

1. In combination, a pulley having spaced side walls adapted to be in driving engagement with the side walls of a belt, a belt located between said side walls in driving engagement therewith, said side walls having spaced grooves so arranged that a given point on the incoming portion of the belt side wall will enter an open outer end of one of said grooves and will travel through said groove towards the center of the pulley in a path until that point on the belt has reached its closest point to the center of the pulley incident to the belt's full insertion between the side walls of the pulley and will continue therein in a stationary condition relative to said groove and said pulley until the given point on the belt moves upwardly in a reverse direction in said groove incident to the belt at that point leaving the pulley.

2. In combination, a pulley having spaced side walls adapted to be in driving engagement with the side walls of a belt, a belt located between said side walls in driving engagement therewith, said side walls having arcuate spaced grooves so arranged that a given point on the incoming portion of the belt side wall will enter an open outer end of one of said grooves and will travel through said groove towards the center of the pulley in an arcuate path until that point of the belt has reached its closest point to the center of the pulley incident to the belt's full insertion between the side walls of the pulley and will continue therein in a stationary condition relative to said groove and said pulley until the given point on the belt moves upwardly in a reverse direction in said groove incident to the belt at that point leaving the pulley, said belt being of yieldable material whereby its side walls opposite said grooves will be compressed outwardly by the tension on the belt to form arcuate ridges corresponding to the arcuate grooves on the pulley walls and projected therein as the side walls of the belt come opposite to said grooves whereby arcuate grooved driving faces are formed on the side walls of said belt for engagement with the arcuate grooves on the side walls of said pulley.

3. In combination, a side wall driving pulley having spaced walls with grooves thereon semi-circular in cross section, a raw edged side wall driving belt engaging therewith adapted to have its side driving edges when the belt is under tension forced outwardly in the grooves in the sides of said pulley to form additional driving surfaces, said grooves being so arranged that the portions on the side wall of the belt forced therein will progressively increase in length as said grooves move over the side wall surfaces of the belt due to the entrance of the belt into the pulley.

4. In combination, a side wall driving pulley having spaced walls with grooves thereon, a raw edged side wall driving belt engaging therewith adapted to have its side driving edges when the belt is under tension forced outwardly into the grooves in the sides of said pulley to form additional driving surfaces, said grooves being so arranged that the portions on the side wall of the belt forced therein will progressively increase in length as said grooves move over the side wall surface of the belt due to the entrance of the belt into the pulley, and will progressively decrease in length as the belt moves away from the pulley on a departure therefrom when the grooves in the side walls of the pulley will progressively move away from the sides of the belt.

5. In combination, a pulley having spaced side walls adapted to be in driving engagement with the side walls of a belt, a belt located between said side walls in driving engagement therewith, said side walls having arcuate spaced grooves so arranged that a given point on the incoming portion of the belt side wall will enter an open outer end of one of said grooves and will travel through said groove towards the center of the pulley in an arcuate path until that point on the belt has reached its closest point to the center of the pulley incident to the belt's full insertion between the side walls of the pulley and will continue therein in a stationary condition relative to said groove and said pulley until the given point on the belt moves upwardly in a reverse direction in said groove incident to the belt at that point leaving the pulley.

6. A pulley having a V-shaped belt groove therein, each wall of said groove having therein spaced arcuate grooves extending from the periphery of the pulley toward the bottom of the groove, and each arcuate groove of one wall being opposite an arcuate groove in the other wall.

In testimony whereof, I affix my signature.

ABRAHAM L. FREEDLANDER.